United States Patent Office 3,219,956
Patented Nov. 23, 1965

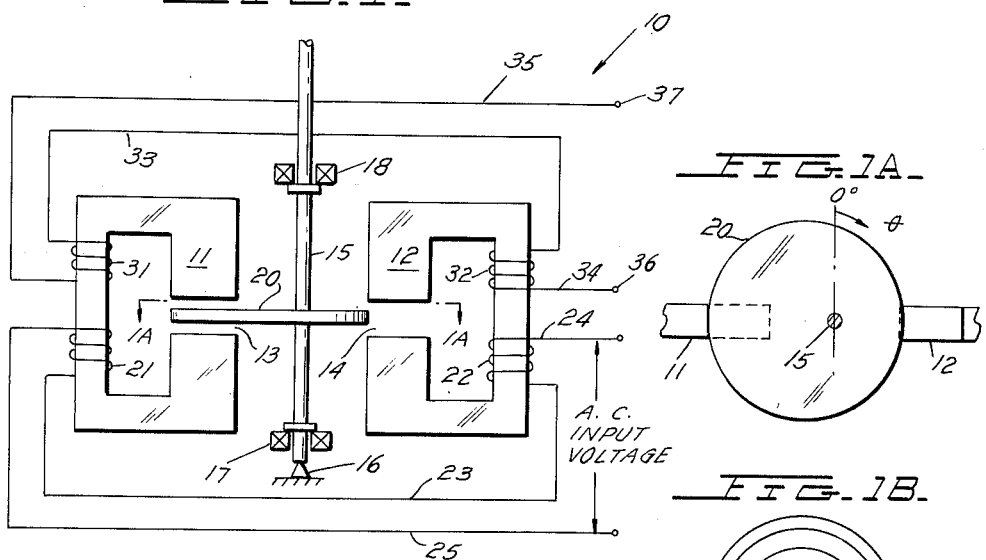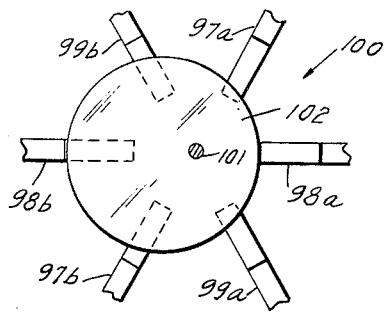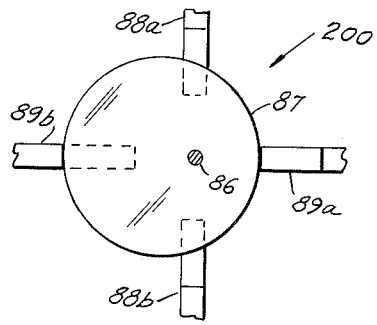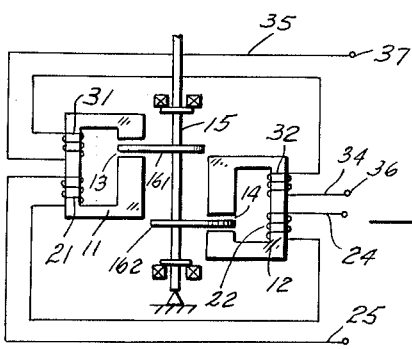
INVENTORS
WILLIAM H. NEWELL
LEONARD MATERO
BY Raymond R. Skolnick
AGENT

3,219,956
BRUSHLESS ROTARY INDUCTIVE DEVICES
William H. Newell, Mount Vernon, and Leonard Matero, Floral Park, N.Y., assignors to Sperry Rand Corporation, Ford Instrument Company Division, Long Island City, N.Y., a corporation of Delaware
Filed Sept. 22, 1961, Ser. No. 140,652
4 Claims. (Cl. 336—79)

This invention relates to electro mechanical rotary devices utilized for data transformation and more particularly to devices of this type which do not require slip rings and brushes or any other form of electrical contact means between relative rotating parts.

Synchros and related devices, such as resolvers, induction potentiometers, induction functional generators and gyro pickoffs, have in the past included slip rings and brushes to complete electrical circuits between rotating and static members. Quite often the slip rings and brushes have proven to be the least reliable portion of these devices. The instant invention provides a construction for these devices which eliminates the necessity for slip rings and brushes.

The absence of an electro mechanical sliding link increases reliability in performance since fewer parts are required; friction contact between bearing surfaces is eliminated; there is freedom from vibration and shock environments; there is freedom from a voltage drop, often varying, across contact members; there is freedom from the corrosive effects of moisture or other fluids; there is freedom from electrical failure in that there are no contacts to open and shorts cannot develop as a result of surface leakages or dielectric breakdown; there is freedom from thermal failure; there is freedom from voltage transients due to make-break effects; and starting as well as running losses are reduced since friction is material reduced.

The instant invention achieves the foregoing advantageous operation by providing two magnetic circuits each having an air gap within which a conductive member is movable. The member is mounted to the input shaft of the device for movement in a manner such that the reluctance of one of the magnetic circuits will be increased while that of the other circuit is being decreased. Each of the circuits is provided with an individual flux generating means energized by a source of alternating voltage and is provided with an inductively coupled output coil. The output coils are connected in series to produce an output voltage which varies as a function of shaft position.

Accordingly, a primary object of this invention is to provide a brushless synchro device.

Still another object is to provide a device of this type which is inexpensive to produce and will have a long operating life.

Still another object is to provide a device of this type having reduced friction losses.

A further object is to provide a device of this type which will produce an extremely accurate transformation between electrical and mechanical data.

These as well as other objects of this invention shall become readily apparent after reading the following description of the accompanying drawings in which:

FIGURE 1 is a side elevation in schematic form of a potentiometer constructed in accordance with the teachings of the instant invention.

FIGURE 1A is a fragmentary plan view of the device of the instant invention taken along line 1A—1A of FIGURE 1.

FIGURE 1B is a view similar to FIGURE 1A in which the flux changing means is a printed element.

FIGURE 2 is a view similar to FIGURE 1A illustrating a synchro constructed in accordance with the teachings of the instant invention.

FIGURE 3 is a plan view similar to FIGURE 1A illustrating a resolver constructed in accordance with the teachings of the instant invention.

FIGURE 4 is a side elevation, similar to FIGURE 1, illustrating another embodiment of this invention in which individual means are provided to vary the two different flux paths.

Now referring to the figures and more particularly to FIGURES 1 and 1A. Inductive device 10 comprises two magnetic circuits defined by pole pieces 11 and 12. Each of the pole pieces 11, 12 is generally rectangular with one leg being wider than the other three legs. The wide legs of pole pieces 11 and 12 are provided with aligned air gaps 13, 14, respectively. Pole pieces 11, 12 are positioned with their wider legs confronting each other.

Input shaft 15 is positioned midway between pole pieces 11 and 12 and is supported for rotation on end bearing 16 as well as side bearings 17 and 18. Thin disc 20 constructed of good electrical conducting material is fixedly secured to input shaft 15 and is positioned in a plane at right angles thereto. As best seen in FIGURE 1A, disc plate 20 is eccentrically mounted to shaft 15 and is in alignment with air gaps 13 and 14 so as to be movable into and out of these air gaps upon rotation of shaft 15 for a reason to be hereinafter explained.

Pole pieces 11 and 12 are provided with energizing coils 21 and 22, respectively, which are mounted to legs of the respective pole pieces. Jumper 23 connects energizing coils 21, 22 in electrical series with this series combination being connected by jumpers 24, 25 to an A.C. energizing source. Pole pieces 11, 12 are also provided with data or output coils 31, 32, respectively, mounted to legs of their associated pole pieces. Jumper 33 electrically connects output coils 31, 32 in electrical series while jumpers 34 and 35 connect this series combination to output terminals 36 and 37, respectively.

The exciting coils 21 and 22 are connected in the same direction so that the magnetic fluxes in gaps 13 and 14 are in the same directions. Output coils 31, 32 are oppositely connected for a reason to be hereinafter explained. Conductive disc 20 will, to a great extent, control the reluctance in the air gap portions 13, 14 of the magnetic circuits comprising pole pieces 11 and 12 in that disc 20 acts as a shorted turn to interfere with the passage of flux across gaps 13 and 14.

The geometry of inductive device 10 is such that upon rotation of input shaft 15 the shading of flux through gap 13 is opposite to that in gap 14 so that there is no change in the total flux of the combined magnetic circuits 11, 12. Instead, there is only a redistribution of flux as disc 20 rotates. This results in a functional variation in the output voltage in accordance with the following equation.

$$E \text{ out} = KE \text{ input} \sin(wt+\phi) \sin \theta$$

where

K is a proportionality constant
$w$ is the supply frequency
$\phi$ is the time phase shift of the output with respect to the input voltage
$\theta$ is the angular position of the shaft.

It should be obvious to those skilled in the art that the output voltage appearing across terminals 36, 37 may be made to vary as almost any desired function of the position of shaft 15 by appropriately shaping the conductive disc carried by shaft 15.

In the embodiment of FIGURE 1B conductive plate 20 is replaced by conductive element 151 carried by insulating member 152, carried by shaft 15. Element 151 is perferably formed upon member 152 by a printed circuit technique well known to the art.

FIGURE 2 illustrates a synchro device 100 constructed in accordance with the instant invention. Synchro device 100 comprises three pairs of pole pieces (97a, 97b), (98a, 98b), and (99a, 99b) circularly arranged about input shaft 101 which carries conductive disc 102. The pole pairs are displaced 60° from each other and within each pair the pole pieces are disposed 180° apart as in the case of inductive device 10. Each of the pole pieces 97a, 97b, 98a, 98b and 99a, 99b are generally of rectangular shape and are provided with air gaps into which conductive disc 102 extends.

FIGURE 3 illustrates resolver 200 constructed in accordance with the teachings of the instant invention. Resolver 200 comprises pole piece pairs (88a, 88b) and (89a, 89b) in association with conductive disc 87 mounted to input shaft 86. As in the case of inductive device 10 and synchro 100 the pole pieces 88a, 88b, 89a and 89b of resolver 200 are provided with air gaps into which conductive disc 87 extends. It is noted that pole pairs (88a, 88b) and (89a, 89b) are displaced by 90° and that within each pole pair the poles are displaced 180°.

While FIGURES 2 and 3 do not illustrate energizing and output coils, it is to be understood that each of the pole pieces illustrated in FIGURES 2 and 3 is provided with an energizing and an output coil just as in the embodiment of FIGURE 1 with appropriate connections being made between the coils to achieve a desired output which is a function of the angular position of the respective input shafts.

FIGURE 4 illustrates an embodiment of this invention having greater flexibility than the embodiment of FIGURE 1. That is, in FIGURE 1 the same conductive element 20 is utilized to control the flux in both magnetic circuits whereas in FIGURE 4 individual conductive elements are provided for each of the magnetic circuits. Thus, air gap 13 of pole piece 11 is provided with a conductive element (not shown) carried by insulating member 161 and air gap 14 of pole piece 12 is provided with a conductive element (not shown) carried by insulating member 162. Both members 161 and 162 are carried by input shaft 15 and rotatable therewith to vary the reluctance of air gaps 13, 14 in a predetermined manner, thereby generating the desired function at data terminals 36, 37 when, as in the embodiment of FIGURE 1, an A.C. input voltage is applied at terminals 24, 25".

Thus, this invention provides a novel construction for synchros and synchro-like devices which does not require the utilization of slip rings and brushes so that operation thereof is made more reliable and construction costs are reduced.

In the foregoing, the invention has been described only in connection with preferred embodiments thereof. Many variations and modifications of the principles of the invention within the scope of the description herein are obvious. Accordingly, it is to be bound not by the specific disclosure herein but only by the appending claims.

We claim:

1. In a device of the class described a first and a second pole piece each having an air gap, an individual energizing coil for each of said pole pieces, an individual output coil for each of said pole pieces, a shaft rotatably mounted between said pole pieces, an electrically conductive plate mounted to said shaft and movable in said air gaps in varying degrees depending upon the angular position of said shaft, first means electrically connecting said energizing coils to each other and second means electrically connecting said output coils to each other whereby upon energization of said energizing coils by a source of alternating voltage the voltages induced in said output coils are combined to produce a voltage output that is a function of shaft position.

2. The device of claim 1 in which the first means connects the energizing coils such that the fluxes in said air gaps are in the same directions; said second means connecting said output coils in opposition.

3. The device of claim 2 is which the shaft is mounted midway between the pole pieces; said plate being positioned in a plane transverse to the direction of flux in said air gaps.

4. In a device of the class described a first and a second pole piece each having an air gap, an individual energizing coil for each of said pole pieces, an individual output coil for each of said pole pieces, a shaft rotatably mounted between said pole pieces, an electrically conductive plate mounted to said shaft and movable in said air gaps in varying degrees depending upon the angular position of said shaft, first means electrically connecting said energizing coils to each other and second means electrically connecting said output coils to each other whereby upon energization of said energizing coils by a source of alternating voltage the voltages induced in said output coils are combined to produce a voltage output that is equal to $KE$ input $\sin(wt+\phi) \sin \theta$ where $w$ is the frequency of said source, $\phi$ is the time phase shift of the voltage output with respect to the source voltage, $\theta$ is the angular position of said shaft, E input is the magnitude of the alternating voltage, $t$ is time, and K is a proportionality constant.

References Cited by the Examiner

UNITED STATES PATENTS

| | | | |
|---|---|---|---|
| 400,515 | 4/1889 | Thomson | 336—79 X |
| 2,075,125 | 3/1937 | Mabry et al. | 336—79 X |
| 2,468,126 | 4/1949 | Silver | 336—79 |
| 2,763,781 | 9/1956 | Wernlund | 336—79 X |
| 2,986,714 | 5/1961 | Smith | 336—79 X |
| 3,105,212 | 9/1963 | Schwartz | 336—87 |

JOHN F. BURNS, *Primary Examiner.*